United States Patent [19]

Manno

[11] 4,294,031
[45] Oct. 13, 1981

[54] HOOK-STRAND CONNECTING

[76] Inventor: Joseph T. Manno, Star Rte., Kane, Pa. 16735

[21] Appl. No.: 113,379

[22] Filed: Jan. 18, 1980

Related U.S. Application Data

[63] Continuation-in-part of Ser. No. 933,503, Aug. 14, 1978, Pat. No. 4,209,933.

[51] Int. Cl.³ .............................................. A01K 83/00
[52] U.S. Cl. .................................. 43/43.16; 43/44.85
[58] Field of Search ................. 43/43.16, 44.85, 44.87, 43/43.4

[56] References Cited

U.S. PATENT DOCUMENTS

| | | | |
|---|---|---|---|
| 699,397 | 5/1902 | Lacey | 43/43.16 |
| 1,333,101 | 3/1920 | Cooper | |
| 2,202,976 | 6/1940 | Wise | |
| 2,227,420 | 1/1941 | Augenblick | |
| 3,604,143 | 9/1971 | Sauers | |
| 4,107,866 | 8/1978 | Manno | 43/44.85 |

FOREIGN PATENT DOCUMENTS 23462 of 1907 United Kingdom ............... 43/43.16

*Primary Examiner*—Jimmy C. Peters
*Attorney, Agent, or Firm*—Cushman, Darby & Cushman

[57] ABSTRACT

An integral structure is provided for ready attachment to a strand. The simple structure consists only of a first end forming a hook, a second end forming a strand receiving portion, a middle portion between the first and second ends, and a generally T-shaped projection formed from the middle portion for friction wrapping of a strand to the structure. The projection consists of a cross portion of the T spaced from and generally parallel to the middle portion, and a leg portion of the T interconnecting the cross portion to the middle portion. The leg portion is relatively short compared to the thickness of a strand to be received thereby so that a strand may be wrapped around the leg portion several times and tightly frictionally engaged by both the middle portion and the cross portion. The structure is formed by a continuous piece of metal bent to form the hook, strand receiving portion, and T-shaped projection, all of which structure are coplanar. The second end forming a strand receiving portion may comprise an eyelet, or preferably a loop portion and a terminating portion extending from the loop portion toward the hook.

10 Claims, 5 Drawing Figures

HOOK-STRAND CONNECTING

CROSS REFERENCE TO RELATED APPLICATIONS

This application is a continuation-in-part of application Ser. No. 933,503, filed Aug. 14, 1978, now U.S. Pat. No. 4,209,933 issued July 1, 1980.

BACKGROUND AND SUMMARY OF THE INVENTION

It has long been recognized that the knotting of strands to hooks is a delicate and time consuming procedure and desirably is to be avoided. Especially for the connection of fine fishing line to small fish hooks, it is difficult for large segments of the population to properly thread or tie the line to the hook, older people and children having especially great difficulties in accomplishing such a task. Because of that, there have been various proposals for the formation of a hook structure that avoids the necessity for tying of a knot, such as shown in U.S. Pat. No. 1,333,101 and No. 3,604,143. Such prior proposed structures are not known to be entirely commercially successful, however, perhaps due to complicated manufacturing procedures or difficulties of use.

In U.S. Pat. No. 4,107,866, a minnow rig assembly is proposed that is successful in allowing quick and easy attachment of a line to the mouth-engaging hook of the minnow rig assembly. Such a hook includes line receiving portions formed on opposite sides of a T-shaped projection, through which portions the line is passed while wrapped around the projection. According to the present invention it has been found that the advantages associated with the mouth hook of the minnow rig assembly in U.S. Pat. No. 4,107,866 can be achieved in a hook per se, while providing an even simpler, more efficient, and easier to use structure.

According to the present invention, an integral structure is provided for ready attachment to a strand. The integral structure preferably has use as a fishing hook, and the strand is a fishing line, although other uses for the hook and other types of strands may also be utilized. The integral structure according to the invention is simple to manufacture, and may be successfully used by all segments of the population for attachment of a strand to the structure without requiring knotting of the strand.

The integral structure according to the present invention consists essentially of the following components: a first end forming a hook; a second end forming a strand receiving portion; a middle portion between the first and second ends; and a generally T-shaped projection means formed from the middle portion for friction wrapping of a strand to the structure. The projection means consists of a cross portion of the T spaced from and generally parallel to the metal portion, and a leg portion of the T interconnecting the cross portion to the middle portion, the leg portion being relatively short compared to the thickness of a strand to be received thereby so that a strand may be wrapped around the leg portion several times and be tightly frictionally engaged by both the middle portion and the cross portion. Preferably the structure according to the invention is formed by a continuous piece of metal (e.g. spring steel) bent to form the hook, strand receiving portion, and T-shaped projection means. The ends of the cross portion may include portions that are located closer to the middle portion than the other portions of the cross portion at the connection of the leg portion to the cross portion.

In one embodiment of the structure according to the present invention, the second end forming a strand receiving portion comprises an eyelet. In the preferred embodiment according to the present invention, the second end forming a strand receiving portion comprises a loop portion and a terminating portion extending from the loop portion toward the hook. The terminating portion extends generally parallel to the middle portion is spaced therefrom a distance less than the thickness of a strand to be received by the loop portion, while allowing the strand to be forced between it and the middle portion. For ease of assembly and use, preferably the T-shaped projection means, loop portion, terminating portion, and hook are coplanar.

It is the primary object to provide a simple and effective integral structure for ready attachment to a strand, such as a fish hook readily attachable to a fishing line without knotting. This and other objects of the invention will become clear from an inspection of the detailed description of the invention, and from the appended claims.

DETAILED DESCRIPTION OF THE DRAWINGS

Figure 1:
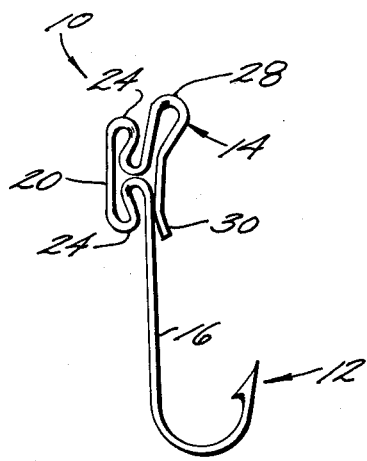
FIG. 1 is a side view of a first embodiment of an exemplary structure according to the present invention.

An integral structure for ready attachment to a strand is shown generally at 10 in the drawings. The structure 10 consists of only a few basic components, no other structures being necessary to facilitate performance of the ultimate strand-connecting capabilities thereof, and the structure 10 being extremely simple and easy to manufacture and use.

The major components of the structure 10 comprise a first end 12 forming a hook; a second end 14 forming a strand receiving portion; a middle portion 16 between the first and second ends 12, 14; and a generally T-shaped projection means 18 formed from the middle portion 16 for friction wrapping of a strand S to the structure. The projection means 18 consists of a cross portion 20 of the T spaced from and generally (although not necessarily exactly) parallel to the middle portion 16, and a leg portion 22 of the T interconnecting the cross portion 20 to the middle portion 16. As illustrated in the drawings, the leg portion 22 is relatively short compared to the thickness of the strand S to be received thereby so that the strand may be wrapped around the leg portion 22 one or more times and be tightly frictionally engaged by both the middle portion 16 and the cross portion 20 (see FIGS. 3 and 5 in particular). In the preferred embodiment illustrated in the drawings, the ends of the cross portion 20 include portions 24 that are located closer to the middle portion 16 than are the portions 25 of the cross portion at the connection of the leg portion 22 to the cross portion 20. In this situation, of course, not all of the cross portion 20 is exactly parallel to the middle portion 16.

The structure 10 preferably is formed by a continuous piece of metal, such as spring steel or the like. The metal is bent to form the hook 12, strand receiving portion 14, and T-shaped projection means 18. Preferably the continuous piece of metal comprises a wire, which may have a round, oblong, or other cross-section.

Figure 2:
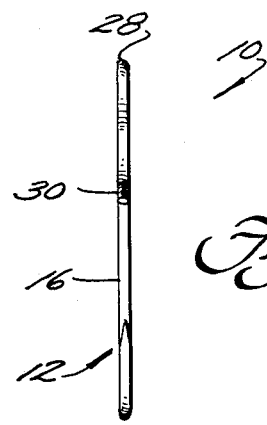
FIG. 2 is a top plan view of the structure of FIG. 1.
Figure 3:
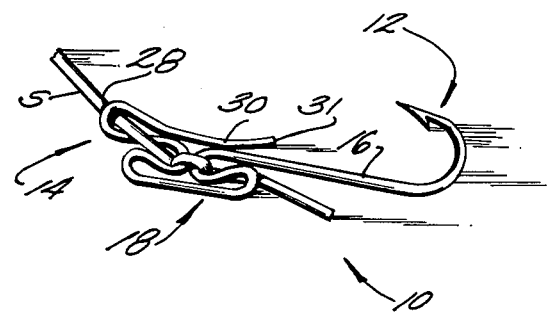
FIG. 3 is a perspective view of the structure of FIG. 1 shown connected to a strand.

In the preferred embodiment illustrated in FIGS. 1 through 3, the second end 14 forming the strand receiving portion comprises a loop portion 28 and a terminating portion 30 extending from the loop portion 28 toward the hook 12. The terminating portion 30 extends generally parallel to the middle portion 16 (see FIGS. 1 and 3 in particular) and is spaced therefrom a distance less than the thickness of a strand S to be received by the loop portion 28, while allowing the strand to be forced between it and the middle portion. Typically, the strand would be passed between the up-turned tip 31 of the terminating portion 30 and the middle portion 16, and it would be pulled toward the loop 28, causing the terminating portion 30 to be cammed upwardly to allow passage of the strand to the loop 28, at which time the terminating portion 30 would return to its normal spacing from the middle portion 16 due to the inherent resilience thereof.

For ease of manufacture and use, the T-shaped projection means 18, loop portion 28, terminating portion 30, and hook 12 preferably are coplanar, as clearly illustrated in FIG. 2. The projection means 18 and terminating portion 30 are disposed on opposite sides of the middle portion 16.

Figure 4:
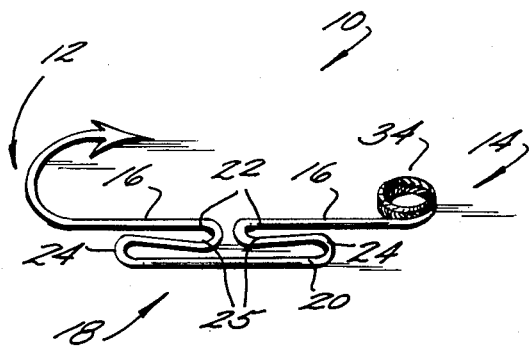
FIG. 4 is a perspective view of a second embodiment of a structure according to the present invention.
Figure 5:
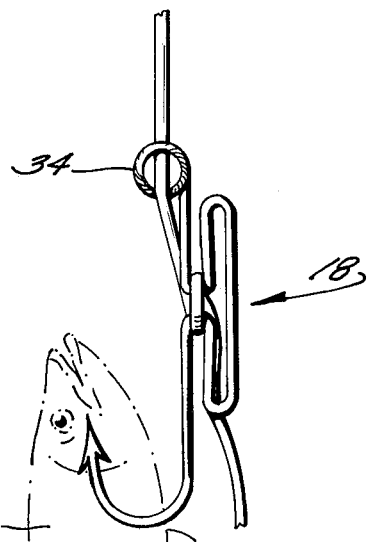
FIG. 5 is a side view of the structure of FIG. 4 shown connected to a strand and used as a fishing hook.
Figure 5:

In the second embodiment illustrated in FIGS. 4 and 5, the second end 14 forming the strand receiving portion comprises an eyelet 34. The eyelet 34 may be formed by a single loop or multiple loops of the material forming the structure 10. When multiple loops are formed they may be formed in the manner disclosed in parent application Ser. No. 933,503, the disclosure of which is hereby incorporated by reference herein.

In using the structure according to the present invention as a fishing hook, a fishing line (S) may be readily attached thereto, even by older people and children, since no knotting of the line is required. In use, a portion of the strand S spaced a few inches from the end thereof remote from the fishing rod is passed between the terminating portion 30 of the strand receiving portion 14, and the middle portion 16, until it is received by the loop portion 28. This requires no threading of the line. Alternatively, in the embodiment of FIGS. 4 and 5, the line is threaded through the eyelet 34, or forced between the multiple coils of the eyelet 34 (see parent application No. 933,503).

Once the strand is received by the second end 14 strand receiving portion, the end of the strand S is grasped and the strand is wrapped around the leg portions 22 one, two or more times. The strand S is then tightly frictionally engaged by the middle portion 16 and the cross portion 20 of the T, the free end of the strand S hanging loose. The strand S is now securely fastened to the structure 10, and will not come loose during normal use.

As illustrated in FIG. 5, the hook portion 12 may then be inserted into appropriate bait, such as a minnow M, and fishing may be initiated.

The above description of the use is only exemplary, and may be modified both when utilizing the structure 10 for fishing, or for other distinct uses for a structure 10.

It will thus be seen that according to the present invention a simple yet effective integral structure is provided for ready attachment to a strand, which structure is easy to manufacture and use, and can be utilized by large segments of the population. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An integral structure for ready attachment to a strand, said structure consisting essentially of:
    a first end forming a hook;
    a second end forming a strand receiving portion;
    a middle portion between said first and second ends; and
    a generally T-shaped projection means formed from said middle portion for friction wrapping of a strand to said structure, said projection means consisting of a cross portion of the T spaced from and generally parallel to said middle portion, and a leg portion of the T interconnecting said cross portion to said middle portion, said leg portion being relatively short compared to the thickness of a strand to be received thereby so that a strand may be wrapped around said leg portion one or more times and be tightly frictionally engaged by both said middle portion and said cross portion.

2. A structure as recited in claim 1 wherein said second end forming a strand receiving portion comprises an eyelet.

3. A structure as recited in claim 1 wherein said second end forming a strand receiving portion comprises a loop portion and a terminating portion extending from said loop portion toward said hook.

4. A structure as recited in claim 3 wherein said terminating portion extends generally parallel to said middle portion and is spaced therefrom a distance less than the thickness of a strand to be received by said loop portion, while allowing a strand to be forced between it and said middle portion.

5. A structure as recited in claim 4 wherein said T-shaped projection means, loop portion, terminating portion, and hook are coplanar, with said projection means and terminating portion on opposite sides of said middle portion.

6. A structure as recited in claim 3 wherein said T-shaped projection means, loop portion, terminating portion, and hook are coplanar, with said projection means and terminating portion on opposite sides of said middle portion.

7. A structure as recited in claim 2 wherein the ends of said cross portion include portions that are located closer to said middle portion than are the portions of said cross portion at the connection of said leg portion to said cross portion.

8. A structure as recited in claim 3 wherein the ends of said cross portion include portions that are located closer to said middle portion than are the portions of said cross portion at the connection of said leg portion to said cross portion.

9. A structure as recited in claim 8 wherein said T-shaped projection means, loop portion, terminating portion, and hook are coplanar, with said projection means and terminating portion on opposite sides of said middle portion.

10. A structure as recited in claims 1, 2, 3, 5, 8, or 9 wherein said structure is formed by a continuous piece of metal bent to form said hook, strand receiving portion, and T-shaped projection means.

* * * * *